United States Patent
Chu et al.

(10) Patent No.: US 9,443,194 B2
(45) Date of Patent: Sep. 13, 2016

(54) MISSING VALUE IMPUTATION FOR PREDICTIVE MODELS

(75) Inventors: Yea J. Chu, Chicago, IL (US); Sier Han, Xi'an (CN); Jing-Yun Shyr, Naperville, IL (US); Jing Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 13/445,796

(22) Filed: Apr. 12, 2012

(65) Prior Publication Data

US 2013/0226842 A1  Aug. 29, 2013

Related U.S. Application Data

(63) Continuation of application No. 13/403,863, filed on Feb. 23, 2012, now Pat. No. 8,843,423.

(51) Int. Cl.
| | | |
|---|---|---|
| *G06N 5/04* | (2006.01) | |
| *G06N 5/02* | (2006.01) | |
| *G06N 99/00* | (2010.01) | |
| *G06F 15/18* | (2006.01) | |

(52) U.S. Cl.
CPC .......... *G06N 5/025* (2013.01); *G06N 99/005* (2013.01); *G06F 15/18* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,272,617 B1 | 9/2007 | Bayer et al. | |
| 7,523,123 B2 | 4/2009 | Yang et al. | |
| 7,730,003 B2 | 6/2010 | Pinto et al. | |
| 8,533,222 B2 | 9/2013 | Breckenridge et al. | |
| 2003/0088565 A1 | 5/2003 | Walter et al. | |
| 2005/0096950 A1 | 5/2005 | Caplan et al. | |
| 2005/0234698 A1 | 10/2005 | Pinto et al. | |
| 2005/0234763 A1 | 10/2005 | Pinto et al. | |
| 2006/0282306 A1 | 12/2006 | Thissen-Roe | |
| 2007/0150424 A1 | 6/2007 | Igelnik | |
| 2007/0255646 A1 | 11/2007 | Morris et al. | |
| 2008/0059115 A1 | 3/2008 | Wilkinson | |
| 2008/0140609 A1 | 6/2008 | Werner et al. | |

(Continued)

OTHER PUBLICATIONS

Gupta, et al., Nonparametric Supervised Learning by Linear Interpolation with Maximum Entropy, IEEE Transactions on Pattern Analysis and Machine Intelligence, vol. 28, No. 5, May 2006, pp. 766-781.*

(Continued)

*Primary Examiner* — Wilbert L Starks
(74) *Attorney, Agent, or Firm* — Janaki K. Davda; Konrad, Raynes, Davda and Victor LLP

(57) ABSTRACT

Provided are techniques for imputing a missing value for each of one or more predictor variables. Data is received from one or more data sources. For each of the one or more predictor variables, an imputation model is built based on information of a target variable; a type of imputation model to construct is determined based on the one or more data sources, a measurement level of the predictor variable, and a measurement level of the target variable; and the determined type of imputation model is constructed using basic statistics of the predictor variable and the target variable. The missing value is imputed for each of the one or more predictor variables using the data from the one or more data sources and one or more built imputation models to generate a completed data set.

19 Claims, 14 Drawing Sheets

(56) References Cited

U.S. PATENT DOCUMENTS

| | | |
|---|---|---|
| 2008/0228680 A1 | 9/2008 | Chen et al. |
| 2009/0043715 A1 | 2/2009 | Fan et al. |
| 2009/0177598 A1 | 7/2009 | Bhaskar et al. |
| 2009/0182696 A1 | 7/2009 | Menahem et al. |
| 2009/0210371 A1 | 8/2009 | Laan |
| 2009/0222243 A1 | 9/2009 | Zoldi et al. |
| 2009/0299896 A1 | 12/2009 | Zhang et al. |
| 2010/0010878 A1 | 1/2010 | Pinto et al. |
| 2010/0153184 A1 | 6/2010 | Caffrey et al. |
| 2010/0257198 A1 | 10/2010 | Cohen et al. |
| 2011/0066454 A1 | 3/2011 | Rosauer et al. |
| 2011/0105852 A1 | 5/2011 | Morris et al. |
| 2011/0246403 A1 | 10/2011 | Statnikov et al. |
| 2012/0278275 A1 | 11/2012 | Danciu et al. |

OTHER PUBLICATIONS

Agopyan, et al., Financial Business Cloud for High-Frequency Trading, International Journal on Advances in Intelligent Systems, vol. 4 No. 3 & 4, 2011, pp. 203-217.*

Boyraz, An Empirical Study on Early Warning Systems for Banking Sector, Masters Thesis, Middle East Technical University, Graduate School of Social Sciences, Apr. 2012, pp. 1-241.*

Response to Final Office Action, dated Jul. 25, 2013, for U.S. Appl. No. 13/545,817, filed Jul. 10, 2012, entitled "Generating a Predictive Model From Multiple Data Sources", invented by Maius I. Danciu et al., pp. 1-7.

Amendment 1, dated Jan. 7, 2013, for U.S. Appl. No. 13/048,536, filed Mar. 15, 2011 by M.I. Danciu et al., Total 9 pp.

Office Action 1, dated Oct. 5, 2012, for U.S. Appl. No. 13/048,536, filed Mar. 15, 2011 by M.I. Danciu et al., Total 72 pp.

Preliminary Amendment, dated Jul. 10, 2012, for U.S. Appl. No. 13/048,536, entitled "Generating a Predictive Model From Multiple Data Sources", filed Mar. 15, 2011, invented by Marius Danciu et al., pp. 1-22.

Final Office Action, dated Apr. 25, 2013, for U.S. Appl. No. 13/048,536, entitled "Generating a Predictive Model From Multiple Data Sources", filed Mar. 15, 2011, invented by Marius Danciu et al., pp. 1-22.

Response to Final Office Action, dated Jul. 25, 2013, for U.S. Appl. No. 13/048,536, entitled "Generating a Predictive Model From Multiple Data Sources", filed Mar. 15, 2011, invented by Marius Danciu et al., pp. 1-11.

Preliminary Amendment, dated Jul. 10, 2012 for U.S. Appl. No. 13/545,817, filed Jul. 10, 2012, entitled "Generating a Predictive Model From Multiple Data Sources", invented by Maius I. Danciu et al., pp. 1-6.

Office Action, dated Oct. 5, 2012, for U.S. Appl. No. 13/545,817, filed Jul. 10, 2012, entitled "Generating a Predictive Model From Multiple Data Sources", invented by Maius I. Danciu et al., pp. 1-40.

Response to Office Action, dated Jan. 7, 2013, for U.S. Appl. No. 13/545,817, filed Jul. 10, 2012, entitled "Generating a Predictive Model From Multiple Data Sources", invented by Maius I. Danciu et al., pp. 1-7.

Final Office Action, dated Apr. 25, 2013, for U.S. Appl. No. 13/545,817, filed Jul. 10, 2012, entitled "Generating a Predictive Model From Multiple Data Sources", invented by Maius I. Danciu et al., pp. 1-17.

Kinney, S.K., J.P. Reiter, and J.O. Berger, "Model Selection when Multiple Imputation is Used to Protect Confidentiality in Public Use Data", Journal of Privacy and Confidentiality (2010), 2, No. 2, pp. 3-19, [Also Total 18 pp.].

Notice of Allowance, dated Dec. 13, 2013, for U.S. Appl. No. 13/403,863, filed Feb. 23, 2012, entitled "Missing Value Imputation for Predictive Models", invented by Y.J. Chu et al., Total 23 pp.

Office Action 3, dated Mar. 21, 2014, for U.S. Appl. No. 13/048,536, entitled "Generating a Predictive Model From Multiple Data Sources", filed Mar. 15, 2011, invented by Marius Danciu et al., pp. 1-22.

Office Action 3, dated Mar. 27, 2014, for U.S. Appl. No. 13/545,817, entitled "Generating a Predictive Model From Multiple Data Sources", filed Jul. 10, 2012, invented y Marius Danciu et al., pp. 1-17.

Notice of Allowance, dated Oct. 23, 2014, for U.S. Appl. No. 13/048,536, filed Mar. 15, 2011, invented by Marius Danciu et al., Total 12 pages.

Notice of Allowance, dated Oct. 24, 2014, for U.S. Appl. No. 13/545,817, filed Jul. 10, 2012, invented by Marius Danciu et al., Total 12 pages.

Fan, M., "Missing Data Analysis—Multiple Imputation", [Online], Apr. 30, 2008, [Retrieved on Nov. 30, 2011] Retrieved from the internet at <URL: http://staff.washington.edu/tylbrian/Stats_Pres_Missing_Data.ppt>, 41 pp.

Howell, D.C., "The Treatment of Missing Data", [Online], [Retrieved on Nov. 30, 2011], Retrieved from the Internet at <URL: http://www.uvm.edu/~dhowell/StatPages/More_Stuff/Missing_Data/MissingDataFinal.pdf>, 44 pp. [Also available at: Howell, D.C. (2007). The Treatment of Missing Data. In Outhwaite, W. & Turner, S. (eds.) The SAGE Handbook of Social Science Methodology (p. 208-224). London: Sage].

International Society for Bayesian Analysis, "Bayesian Analysis", vol. 2, No. 1, [online], 2007, [Retrieved on Nov. 30, 2011], Retrieved from the Internet at <URL: http://ba.stat.cmu.edu/journal/2007/vol02/issue01/issue01.pdf>, 239 pp.

Loh, W., "Classification and Regression Trees", WIREs Data Mining and Knowledge Discovery, vol. 1, [Online], Jan./Feb. 2011, [Retrieved on Nov. 30, 2011], Retrieved from the Internet at <URL: http://www.stat.wisc.edu/~loh/treeprogs/guide/wires10.pdf>, 10 pp.

Mell, P. and T. Grance, "Effectively and Securely Using the Cloud Computing Paradigm", NIST, Information Technology Laboratory, Oct. 7, 2009, 80 pp.

Mell, P. and T. Grance, "The NIST Definition of Cloud Computing (Draft)", NIST Special Publication 800-145 (Draft), Jan. 2011, 7 pp.

Mikkilineni, R., and V. Sarathy, "Cloud Computing and the Lessons from the Past", In Proceedings of the 18th IEEE International Workshop on Enabling Technologies: Infrastructures for Collaborative Enterprises, 2009, 6 pp.

Sorjamaa, A. and A. Lendasse, "Fast Missing Value Imputation Using Ensemble of SOMS", TKK Reports in Information and Computer Science, TKK-ICS-R33, [Online], 2010, [Retrieved on Nov. 30, 2011], Retrieved from the Internet at <URL: http://lib.tkk.fi/Reports/2010/isbn9789526032481.pdf>, 24 pp.

U.S. Appl. No. 13/048,536, filed Mar. 15, 2011, entitled "Generating a Predictive Model from Multiple Data Sources", invented by M.I. Danciu, F. Li, M. Mcroberts, J. Shyr, D. Spisic, and J. Xu, 25 pp.

U.S. Appl. No. 13/399,838, filed Feb. 17, 2012, entitled "Computing and Applying Order Statistics for Data Preparation", invented by Y.J. Chu, S. Han, F. Li, J. Shyr, D. Spisic, G.J. Wills, and J. Xu, 45 pp.

Von Hippel, P.T., "Data Analysis with Missing Values", [Online], May 2, 2003, [Retrieved on Nov. 30, 2011], retrieved from the Internet at <URL: http://www.sociology.ohio-state.edu/ptv/faq/missing/missing.ppt>, 33 pp.

U.S. Appl. No. 13/403,863, filed Feb. 23, 2012, entitled "Missing Value Imputation for Predictive Models", invented by Y.J. Chu et al., 48 pp.

Notice of Allowance, dated May 22, 2014, for U.S. Appl. No. 13/403,863, filed Feb. 23, 2012, entitled "Missing Value Imputation for Predictive Models", invented by YJ. Chu et al., Total 27 pages.

Response to Office Action, dated Jun. 20, 2014, for U.S. Appl. No. 13/048,536, filed Mar. 15, 2011, entitled, "Generating a Predictive Model from Multiple Data Sources", invented by Marius Danciu et al. , Total 10 pages.

Response to Office Action, dated Jun. 20, 2014, for U.S. Appl. No. 13/545,817, filed Jul. 10, 2012, entitled, "Generating a Predictive Model from Multiple Data Sources", invented by Marius Danciu et al., Total 7 pages.

Notice of Allowance, dated Dec. 23, 2013, for U.S. Appl. No. 13/403,863, filed Feb. 23, 2012, entitled, "Missing Value Imputation for Predictive Models", invented by Yea Chu et al., Total 23 pages.

(56) References Cited

OTHER PUBLICATIONS

Barrow, D.K., S.F. Crone, & N. Kourentzes, "An Evaluation of Neural Network Ensembles and Model Selection for Time Series Prediction", In Proceedings of the 2010 International Joint Conference on Neural Networks, Jul. 2010, 8 pp.

Bifet, A., G. Holmes, B. Pfahringer, R. Kirkby, and R. Gavalda, "New Ensemble Methods for Evolving Data", In Proceedings of the 15th ACM SIGKDD International Conference on Knowledge Discovery and Data Mining, Jun. 28-Jul. 1, 2009, 9 pp.

Chu, C., S.K. Kim, Y. Lin, Y.Y. Yu, G. Bradski, A.Y. Ng, and K. Olukotun, "Map-Reduce Machine Learning on Multicore", Neural Information Processing Systems Foundation, Dec. 2007, 8 pp.

Folino, G., C. Pizzuti, and G. Spezzano, "An Adaptive Distributed Ensemble Approach to Mine Concept-Drifting Data Streams", In Proceedings of the 19th IEEE International Conference on Tools with Artificial Intelligence, 2007, 5 pp.

Folino, G., C. Pizzuti, and G. Spezzano, "Training Distributed GP Ensemble with a Selective Algorithm Based on Clustering and Pruning for Pattern Classification", IEEE Transactions on Evolutionary Computation, vol. 12, Iss. 4, Aug. 2008, 29 pp.

Gardner, D., "How Smart Can Analytics Get?", [online] Jan. 24, 2010, [Retrieved on Dec. 20, 2010], Retrieved from the Internet at <URL: http://www.ecommercetimes.com/story/69180.html?wlc=1288207841&wlc=1288283038>, 6 pp.

Ghosh, J., "Simultaneous (Co)-Clustering and Modeling for Large Scale Data Mining", Fall Creek Falls Conference, [online], Sep. 24, 2009, Retrieved from the Internet at <URL: http://computing.orni.gov/workshops/FallCreek09/agenda.html>, 61 pp.

Grossman, R., "From Data to Decisions: new Strategies for Deploying Analytics Using Clouds", Jul. 29, 2009, 28 pp.

IBM Corporation, "Method and Apparatus for Efficient Grouping in Map-Reduce Applicationsons on GPU", Nov. 18, 2009, IP.com No. IPCOM000190126D, 7 pp.

Kumar, V., H. Andrade, B. Gedik, and K. Wu, "DEDUCE: At the Intersection of MapReduce and Stream Processing", In the Proceedings of the 13th International Conference on Extending Database Technology, Mar. 2010, 6 pp.

Loshin, D., "Together, Showing the Way", Teradata Magazine, [online] Q2/2010, Retrieved from the Internet at <URL: http://www.teradatamagazine.com/v10n02/Tech2Tech/Together-Showing-the-way/>, 3 pp.

Parthasarathy, S., A. Ghoting, and M.E. Otey, "A Survey of Distributed Mining of Data Streams", Data Streams: Models and Algorithms, Chapter 13, 2007, Springer Science+Business Media, LLC, New York, New York, US, 19 pp.

Preliminary Remarks for U.S. Appl. No. 13/403,863, filed Apr. 20, 2012, 1 pp.

Raden, N., "Advanced In-Database Analytics Done Right", May 2010, 17 pp.

Taylor, J., "First Look—Cloudera", [online] Sep. 21, 2010, [Retrieved on Dec. 20, 2010], retrieved from the Internet at <URL: http://jtonedm.com/2010/09/21/first-look-cloudera/>, 5 pp.

Visalakshi, N.K., and K. Thangavel, "Ensemble Based Distributed Soft Clustering", In the Proceedings of the 2008 International Conference on Computing, Communication and Networking, Dec. 2008, 6 pp.

Wegener D., M. Mock, D. Adranale, and S. Wrobel, "Toolkit-Based High-Performance Data Mining of Large Data on MapReduce Clusters", In Proceedings of the 2009 IEEE International Conference on Data Mining Workshops, Dec. 2009, 6 pp.

\* cited by examiner

| Data Source / Predictor Variable / Target Variable | Model Type |
|---|---|
| Small / Continuous / Continuous | Piecewise linear regression imputation model |
| Small / Continuous / Categorical | Robust conditional mean imputation model |
| Small / Categorical / Continuous | Minimum z-score category imputation model |
| Small / Categorical / Categorical | Conditional mode imputation model |
| Large and Distributed / Continuous / Continuous | Ensemble model of piecewise linear regression imputation models |
| Large and Distributed / Continuous / Categorical | Ensemble model of robust conditional mean imputation models |
| Large and Distributed / Categorical / Continuous | Ensemble model of minimum z-score category imputation models |
| Large and Distributed / Categorical / Categorical | Ensemble model of conditional mode imputation models |

FIG. 6

| Data Source / Predictor Variable / Target Variable | Construction |
|---|---|
| Small / Continuous / Continuous | 1. Determine a sequence of bins based on the predictor variable values.<br>2. Gather basic statistics between the predictor variable and target variable for each bin.<br>3. Build a linear regression model based on the gathered statistics for each bin.<br>4. Perform bin determination when a target variable value can be mapped to multiple bins by using a random number generated from a multinomial distribution. |
| Small / Continuous / Categorical | 1. Determine a sequence of bins based on the predictor variable values.<br>2. Gather basic statistics of the predictor variable on a list of target variable categories and the bins.<br>3. Remove the bins in both tails.<br>4. Compute the robust conditional means of the predictor variable from the remaining bins conditional on the target variable category. |
| Small / Categorical / Continuous | 1. Gather basic statistics of the target variable for each category of the predictor variable.<br>2. Compute the z-score of the target variable for each category of the predictor variable.<br>3. Select the category with the minimum z-score. |
| Small / Categorical / Categorical | 1. Construct the contingency table for a list of target variable categories and a list of predictor variable categories.<br>2. Select the mode of the predictor variable conditional on the target variable category. |
| Large and Distributed / Continuous / Continuous | 1. For each partition of the dataset, construct a candidate model as described above, but in a distributed manner. |
| Large and Distributed / Continuous / Categorical | 2. Construct a global validation set by extracting samples from all partitions. |
| Large and Distributed / Categorical / Continuous | 3. Score the candidate models using the global validation set, in a distributed manner. |
| Large and Distributed / Categorical / Categorical | 4. Select the K highest scoring candidate models for inclusion in the final ensemble. |

FIG. 7

| Y<br>X | 1 | 2 | ... | J |
|---|---|---|---|---|
| $(a_1,a_2]$ | $n^{(1,1)}, \bar{X}^{(1,1)}$ | $n^{(1,2)}, \bar{X}^{(1,2)}$ | ... | $n^{(1,J)}, \bar{X}^{(1,J)}$ |
| $(a_2,a_3]$ | $n^{(2,1)}, \bar{X}^{(2,1)}$ | $n^{(2,2)}, \bar{X}^{(2,2)}$ | ... | $n^{(2,J)}, \bar{X}^{(2,J)}$ |
| ⋮ | ⋮ | ⋮ | ⋮ | ⋮ |
| $(a_m,a_{m+1}]$ | $n^{(m,1)}, \bar{X}^{(m,1)}$ | $n^{(m,2)}, \bar{X}^{(m,2)}$ | ... | $n^{(m,J)}, \bar{X}^{(m,J)}$ |

MISSING VALUE IMPUTATION FOR PREDICTIVE MODELS

CROSS-REFERENCE TO RELATED APPLICATIONS

This application is a continuation of and claims the benefit of U.S. patent application Ser. No. 13/403,863, filed Feb. 23, 2012, which application is incorporated herein by reference in its entirety.

FIELD

Embodiments of the invention relate to missing value imputation for predictive models.

BACKGROUND

Predictive models are widely used and are often built on demographic, survey, and other data that contain many missing values. When these missing values are not handled appropriately during model building, then the predictive model is not reliable, and any decision based on the predictive model may result in losses for a company. In addition, existing techniques for imputation of missing data do not efficiently handle the very large and distributed data sources that are now encountered in practice.

Some existing techniques for imputing missing values are: mean imputation, regression imputation, multiple imputation, an Expectation Maximization (EM) algorithm, and a technique that imputes missing values while building a predictive model.

Mean imputation replaces missing values of a continuous variable with a mean value that is computed based on all non-missing records. Mean imputation may provide inaccurate results.

Regression imputation regresses the variable that has missing values on all other variables and then uses the regression equation to impute missing values for that variable. Random errors can be added to the imputed values to overcome the problem in underestimating the variance in the imputed variable. Regression imputation may provide inaccurate results if the data does not follow the assumptions of a linear regression model. For example, when the variable to be imputed is a categorical variable, the variable to be imputed has a non-linear relationship with other variables used to impute. Moreover, regression imputation may regress the variable with missing values on all other variables, so the imputation model building is not based on some basic descriptive statistics.

Multiple imputation builds imputation models for a variable that has missing values on other variables. The imputation model is a linear or logistic regression model for a continuous or categorical variable that has missing values, respectively. Multiple imputation imputes multiple, complete data sets by its imputation process. Then, an appropriate predictive model is built on each complete data set, and the results of the multiple predictive models are combined. The iterative nature of the imputation process may require many data passes to impute a single complete data set, and those data passes are multiplied when multiple complete data sets are created. Multiple imputation uses logistic regression for a categorical variable with missing values, and multiple imputation uses several data passes to obtain the solution for one variable within one imputation because, unlike linear regression, logistic regression does not have a closed form solution and needs an iterative process in which each iteration means one data pass. Thus, the existence of categorical variables with missing values would increase computation cost using multiple imputation.

An Expectation Maximization (EM) algorithm is an iterative technique that alternates between steps (1) and (2) until the process converges on stable estimates, where step (1) estimates the model parameters based on the current data set, and step (2) imputes the missing values based on those estimated parameters to update the data set. Then the fill-in data set is used to re-estimate the parameters. Typically, the EM algorithm is used under a multivariate normal model and missing values are imputed based on a regression model. Moreover, the EM algorithm is an iterative process that requires many data passes. If the predictive model of interest is more complicated than a multivariate normal model, then the EM algorithm is a system of equations which has specific forms for specific applications. Thus, applying the EM algorithm may require skill to obtain the custom-made solutions for different applications.

Another technique imputes missing values while building a predictive model. A population of solutions is created using the data set with missing values, where each solution includes parameters of the model and the missing values. Each of the solutions in a population is checked for fitness. After the fitness is checked, the solutions in a population are genetically evolved to establish a successive population of solutions. The process of evolving and checking fitness is continued until a stopping criterion is reached. This technique may need many runs of populations of solutions to reach the stopping criterion.

SUMMARY

Provided are a computer implemented method, computer program product, and system for imputing a missing value for each of one or more predictor variables. Data is received from one or more data sources. For each of the one or more predictor variables, an imputation model is built based on information of a target variable; a type of imputation model to construct is determined based on the one or more data sources, a measurement level of the predictor variable, and a measurement level of the target variable; and the determined type of imputation model is constructed using basic statistics of the predictor variable and the target variable. The missing value is imputed for each of the one or more predictor variables using the data from the one or more data sources and one or more built imputation models to generate a completed data set.

BRIEF DESCRIPTION OF THE SEVERAL VIEWS OF THE DRAWINGS

In the drawings, like reference numbers represent corresponding parts throughout.

FIG. 5 is formed by FIGS. 5A and 5B.

FIG. 6 illustrates, in a table, determination of a type of imputation model to construct based on data source type (small or large and distributed) and whether predictor variable and target variable variables are categorical or continuous in accordance with certain embodiments.

FIG. 7 illustrates, in a table, constructing an imputation model of the determined imputation model type using basic statistics between a predictor variable and a target variable determined using a single pass over the data in accordance with certain embodiments.

FIG. 10 illustrates, in a table, basic statistics in each combination of the predictor variable data bin and target variable category in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide an efficient system of missing value imputation that has the advantages of a two-step process ((1) impute missing values based on the imputation models; and (2) use the complete data set for the subsequent predictive modeling)) and the ability to model possible nonlinear relationships by building piecewise linear regression models between the variable to be imputed (i.e., the predictor variable) and the variable used to impute (i.e., the target variable). Embodiments use only the target variable for the subsequent model building to impute missing values in the predictor variables. Embodiments can handle missing value imputation with reasonable accuracy for a small data source or large and distributed data sources because embodiments require only one data pass to collect necessary statistics between the predictor variables with missing values and the target variable to build imputation models, which include piecewise linear regression models to be built on a list of data bins that are arranged by the locations of the predictor variables. In embodiments, "m" data bins are created, records are sorted in the "m" data bins based on the values of the predictor variables, and some basic statistics are gathered for building a linear model for each data bin.

Figure 1:
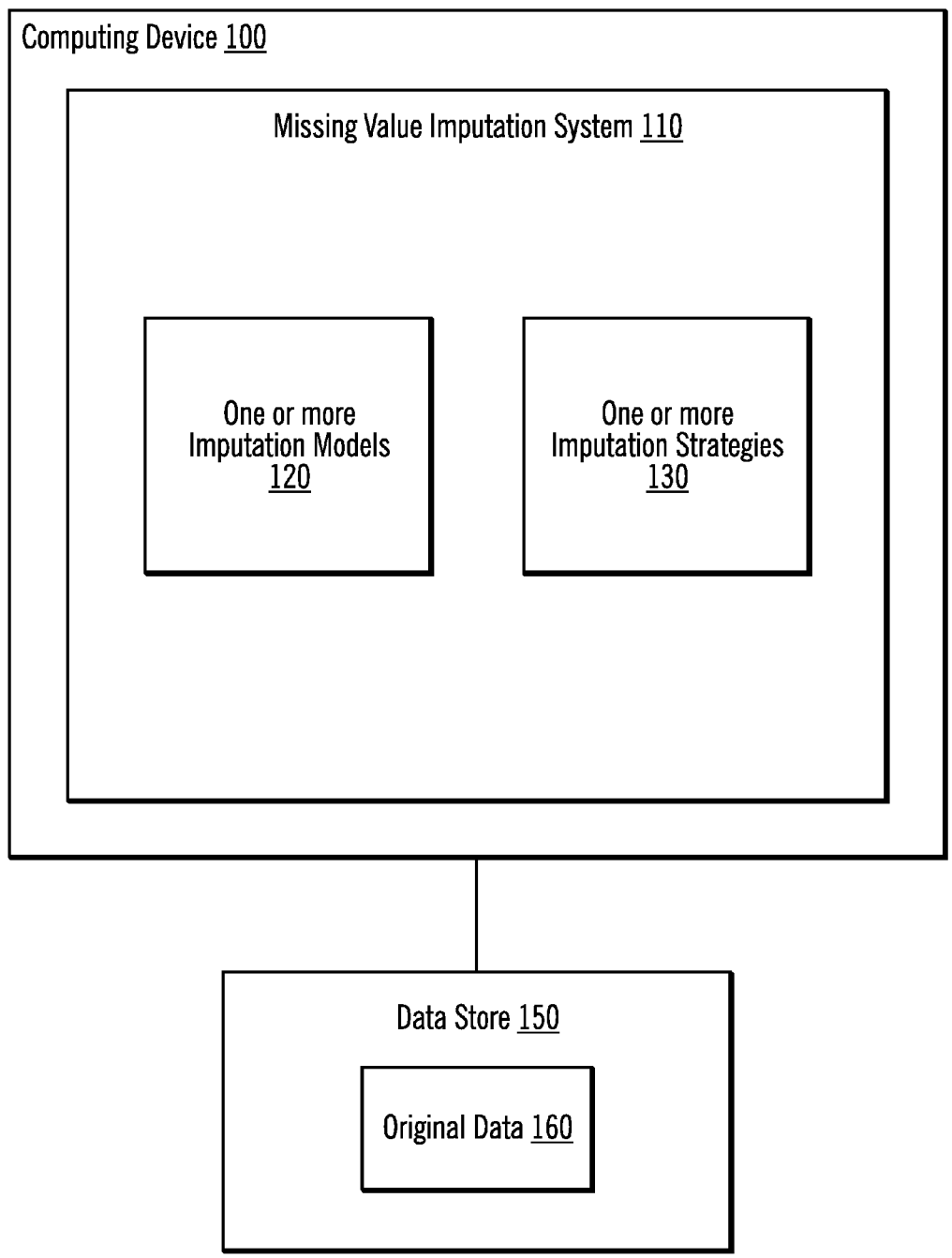
FIG. 1 illustrates, in a block diagram, a computing system in accordance with certain embodiments.

FIG. 1 illustrates, in a block diagram, a computing system in accordance with certain embodiments. In FIG. 1, a computing device 100 includes a missing value imputation system 110, which generates one or more imputation models 120 and one or more imputation strategies 130. The computing device 100 is coupled to a data store 150. The data store 150 includes original data 160. The original data may be from a small data source or may be from large and distributed data sources.

The missing value imputation system 110 provides an efficient system to impute missing values of inputs/predictor variables for the subsequent model building processes on large and distributed data sources (e.g., using a Map-Reduce approach). The Map-Reduce approach may be described as a software framework that supports distributed computing on large and distributed data sources.

First, for each predictor variable that has missing values, imputation models based only on the target variable are built independently on different data sources and on different machines using the Map functions. During this processing, validation samples are extracted randomly across all data sources and merged into one global validation sample along with the collection of imputation models using the Reduce function. Second, all imputation models are evaluated based on the global validation sample in a distributed manner using another set of Map functions to select the top K models and form an ensemble model. Third, the ensemble model and a selected imputation strategy are sent to each data source to impute missing values of the predictor variables. Note that missing values in the target variable would not be imputed, hence those records are not included in the subsequent model building processes. Finally, the complete data sets for all possible predictor variables are used to build any models for prediction, discovery, and interpretation of relationships between the target variable and a set of the predictor variables.

The missing value imputation system 110 chooses only the target variable to build imputation models because (1) if one variable should be selected to make imputation models building feasible, the target variable is the only variable related and relevant to all possible predictor variables with missing values; (2) imputation models for all predictor variables with missing values can be built independently as they only depend on the target variable, so it is not necessary to build imputation models with all variables sequentially and iteratively which is the process used by multiple imputation and many data passes can be saved; and (3) while some information may be lost by not using all possible predictor variables to build the imputation models, experiments indicate the accuracy of results on the subsequent model building processes by using the target variable only are similar to or even better than some conventional techniques (e.g., multiple imputation using all other variables).

In embodiments, the missing value imputation system 110 builds piecewise linear regression imputation models to catch the possible nonlinear relationship between a predictor variable with missing values and the target variable, if both of them are continuous. To build piecewise linear regression imputation models, the data values of the predictor variable are aggregated into a list of data bins. In each data bin, only basic statistics (such as count, means, variance, and covariance) are collected between the predictor variable and target variable, while the data values are discarded, then a regression model is built for each data bin. For other measurement levels of the predictor variable and target variable, the imputation models are built based on some basic statistics as well. A measurement level may be described as continuous or categorical. Therefore, the missing value imputation system 110 uses a single data pass to build imputation models for multiple predictor variables with missing values and fully utilizes distributed computational resources to handle large data. The missing value imputation system 110 uses a limited amount of memory to build each imputation model, and the missing value imputation system 110 uses the target variable to build imputation models so only some univariate and bivariate statistics for predictor variables with missing values and the target variable are needed.

Figure 2:
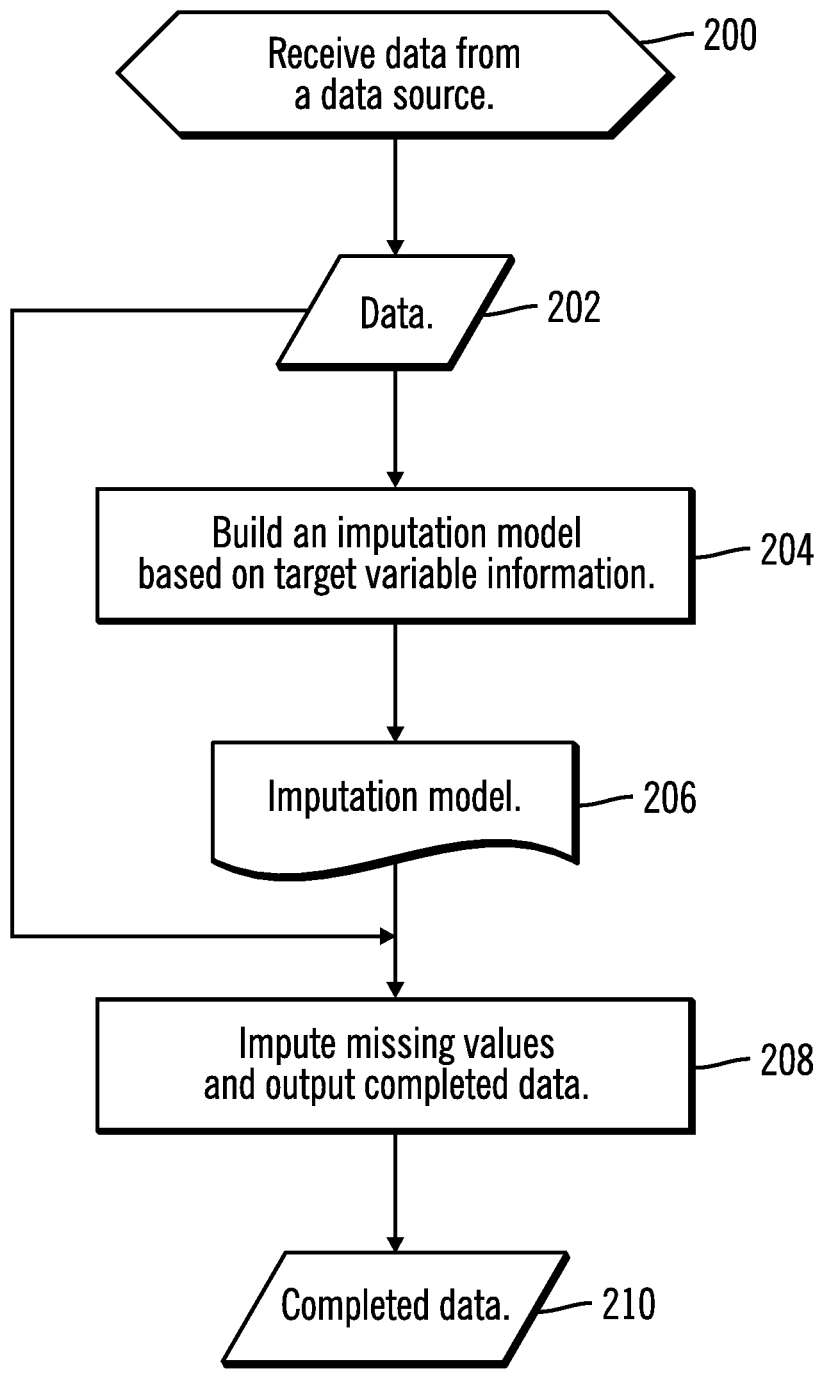
FIG. 2 illustrates, in a flow diagram, missing value imputation for small data source in accordance with certain embodiments.

FIG. 2 illustrates, in a flow diagram, missing value imputation for a small data source in accordance with certain embodiments. In certain embodiments, a small data source is a single data source. Control begins at block 200 with the missing value imputation system 110 receiving data 202 from a data source. The data 202 is input to block 204 and block 208. In block 204, the missing value imputation system 110 builds an imputation model 206 based on target variable information. The imputation model 206, in addition to the data 202, is input to block 208. In block 208, the missing value imputation system 110 imputes missing values and outputs completed data 210.

Figure 3:
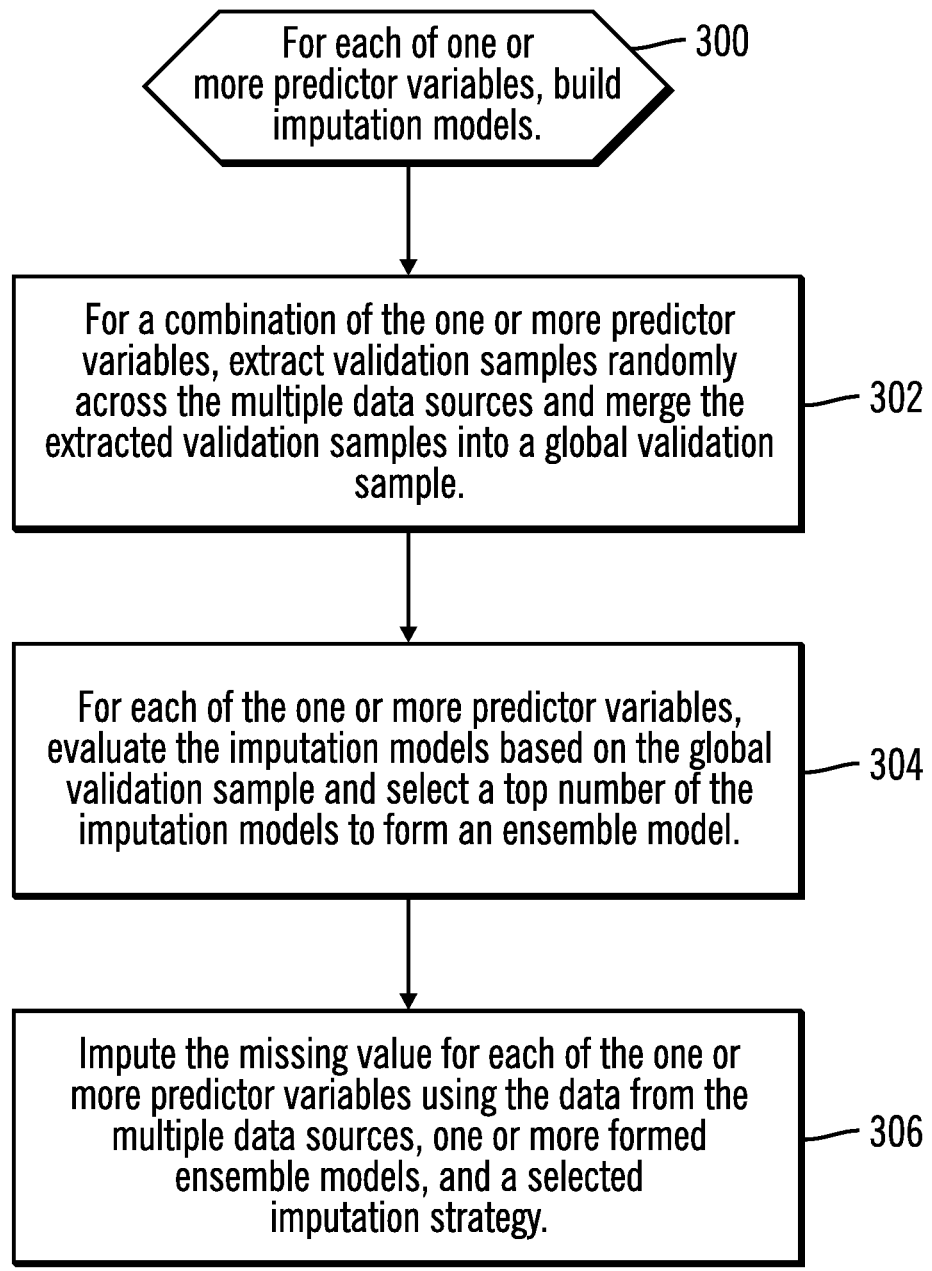
FIG. 3 illustrates, in a flow diagram, missing value imputation for large and distributed data sources in accordance with certain embodiments.

FIG. 3 illustrates, in a flow diagram, missing value imputation for large and distributed data sources in accordance with certain embodiments. Control begins at block 300 with the missing value imputation system 110, for each of one or more predictor variables, building imputation models. In block 300, multiple data sources are distributed into Mappers. A Mapper may be described as a module that runs a computation operation on a data source to generate the required results. An imputation model between each predictor variable with missing values and a target variable is built in each Mapper independently. The kind of imputation model that is built depends on the measurement levels of the predictor variable and target variables. The Mappers will pass imputation models for all predictor variables to a single Reducer. A Reducer may be described as a module that merges the intermediate results from different Mappers and outputs final results. The Reducer has a collection of N imputation models for each of the one or more predictor variables with missing values.

In block 302, the missing value imputation system 110, for a combination of the one or more predictor variables, extracts validation samples randomly across the multiple data sources and merges the extracted validation samples into a global validation sample. In particular, in block 302, a validation sample is randomly extracted from each Mapper independently and the Reducer merges the validation samples into a global validation sample. In certain embodiments, the combination may be all the predictor variables. Block 300 and block 302 represent the first map reduce job.

In block 304, the missing value imputation system 110, for each of the one or more predictor variables, evaluates the imputation models based on the global validation sample and selecting a top number (i.e., a top K) of the imputation models to form an ensemble model. Block 304 represents a second map reduce job. In block 304, a global validation sample is scored by each Mapper to evaluate the accuracy of an imputation model. The Reducer selects the top K imputation models out of N possible imputation models based on some accuracy measures as the final ensemble model for each of the one or more predictor variables with missing values.

In block 306, the missing value imputation system 110 imputes the missing value for each of the one or more predictor variables using the data from the multiple data sources, one or more formed ensemble models, and a selected imputation strategy from the one or more imputation strategies 130. Block 306 represents a third map reduce job. In certain embodiments, the missing value imputation system 110 may be implemented in Hadoop with a MapReduce interface or other comparable systems in order to handle large and distributed data sources and computation in parallel. Hadoop may be described as a software framework that supports data-intensive distributed applications and enables applications to work with thousands of nodes and petabytes of data. In block 306, the final ensemble model for each of the one and more predictor variables with missing values, and an imputation strategy are sent to all Mappers to impute the missing value for each of the one or more predictor variables. If the subsequent model building processes would also run computations in a distributed manner using the Map-Reduce, then there is no need to have a Reducer in block 306. However, if the complete data set should be exported, then the Reducer is used to gather data together.

The imputation strategy may be defined according to how the completed data set (for all possible predictor variables) would be generated. One possible strategy is to impute the missing value for each of the one or more predictor variables by the mean of K predicted values for the continuous predictor variable from the final ensemble model and by the mode of K predicted values for the categorical predictor variable. Another possible strategy is to impute the missing value for each of the one or more predictor variables by the predicted value from a randomly selected imputation model out of K models for the predictor variable to be imputed.

Figure 4:
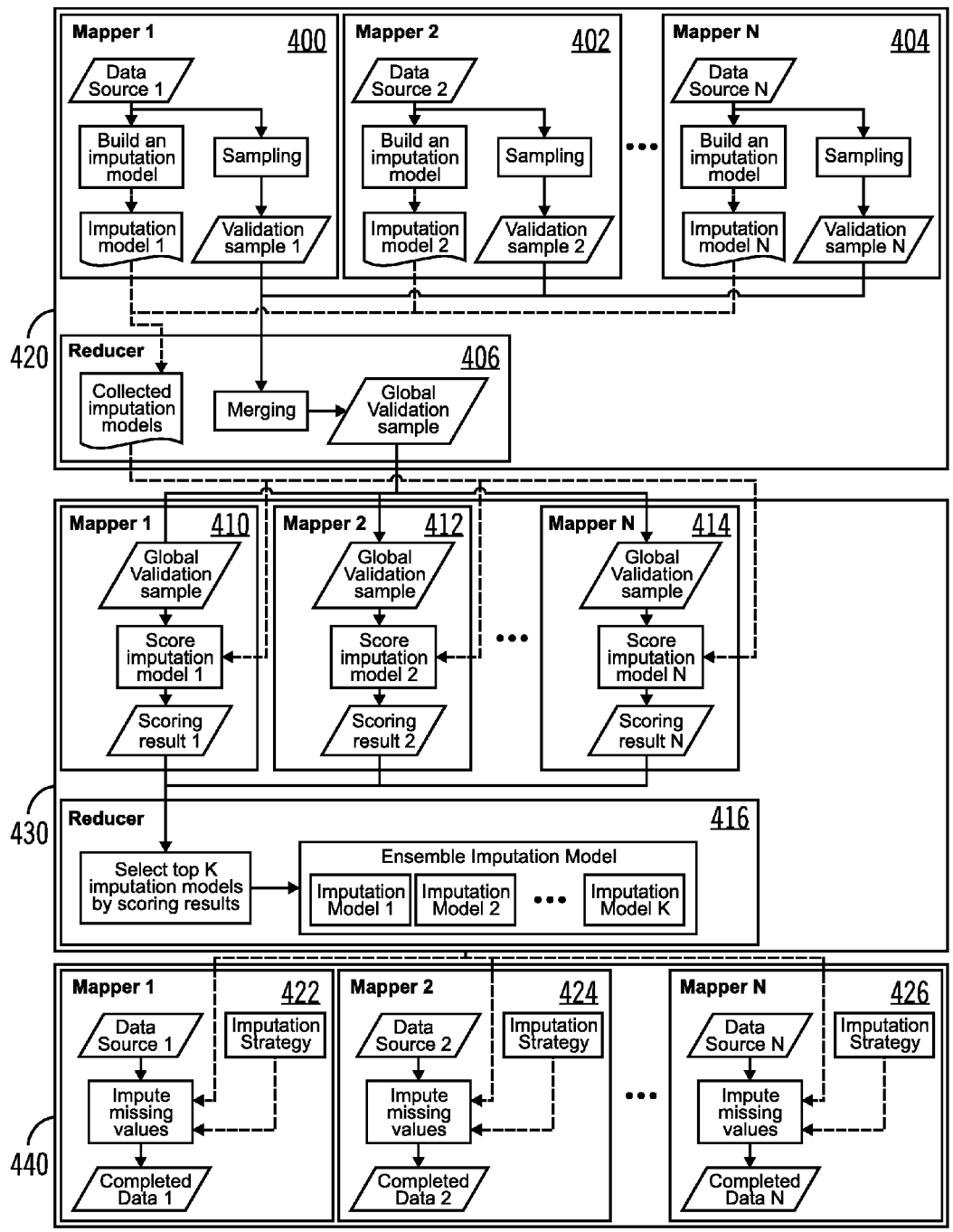
FIG. 4 illustrates, in a flow diagram, further details of missing value imputation for large and distributed data sources in accordance with certain embodiments.

FIG. 4 illustrates, in a flow diagram, further details of missing value imputation for large and distributed data sources in accordance with certain embodiments. In FIG. 4, there are 3 map reduce jobs. Section 420 represents the first map reduce job. Section 430 represents the second map reduce job. Section 440 represents the third map reduce job.

In Section 420, each Mapper 400, 402, 404 receives data from a data source, builds an imputation model for each of the one or more predictor variables to output the imputation model, and samples data to output a validation sample. At the Reducer 406, the imputation models from the Mappers 400, 402, 404 are collected to form the collected imputation models for each of the one or more predictor variables. Also, at the reducer 406, the validation samples from the Mappers 400, 402, 404 are merged to form the global validation sample.

In Section 430, the global validation sample is the input to score an imputation model and a scoring result is the output for each of the one or more predictor variables and for each Mapper 410, 412, 414. The Reducer 416 receives the scoring results from each Mapper 410, 412, 414 and form an ensemble model by selecting the top K imputation models based on the scoring results for each of the one or more predictor variables. Without loss of generality, the ensemble model is denoted as Model 1, . . . , Model K for each of the one or more predictor variables.

In Selection 440, each Mapper 422, 424, 426 imputes the missing value for each of the one or more predictor variables based on a data source, one or more ensemble models and a selected imputation strategy to output the completed data.

Unlike regression imputation and multiple imputation methods, the missing value imputation system 110 uses only the target variable to impute missing values in predictor variables. Thus only univariate and bivariate statistics between the target variable and a predictor variable with missing values are used to build imputation models, regardless of their measurement levels, and those statistics can be computed for all predictor variables within each Mapper or data source independently.

To catch possible nonlinear relationships between a predictor variable with missing values and the target variable, if both of them are continuous, the missing value imputation system 110 builds piecewise linear regression models on a list of data bins of the predictor variable for each Mapper.

Only a single data pass is needed to build the imputation models for all predictor variables with missing values as they are built on each Mapper independently. Such an approach runs computations in a distributed manner and can handle large and distributed data sources efficiently.

Using an ensemble of imputation models instead of only one imputation model to impute missing values gives more robust results for any imputation strategy because outliers would only affect a few imputation models and those models are unlikely to be selected into the final ensemble model.

Figure 5A:
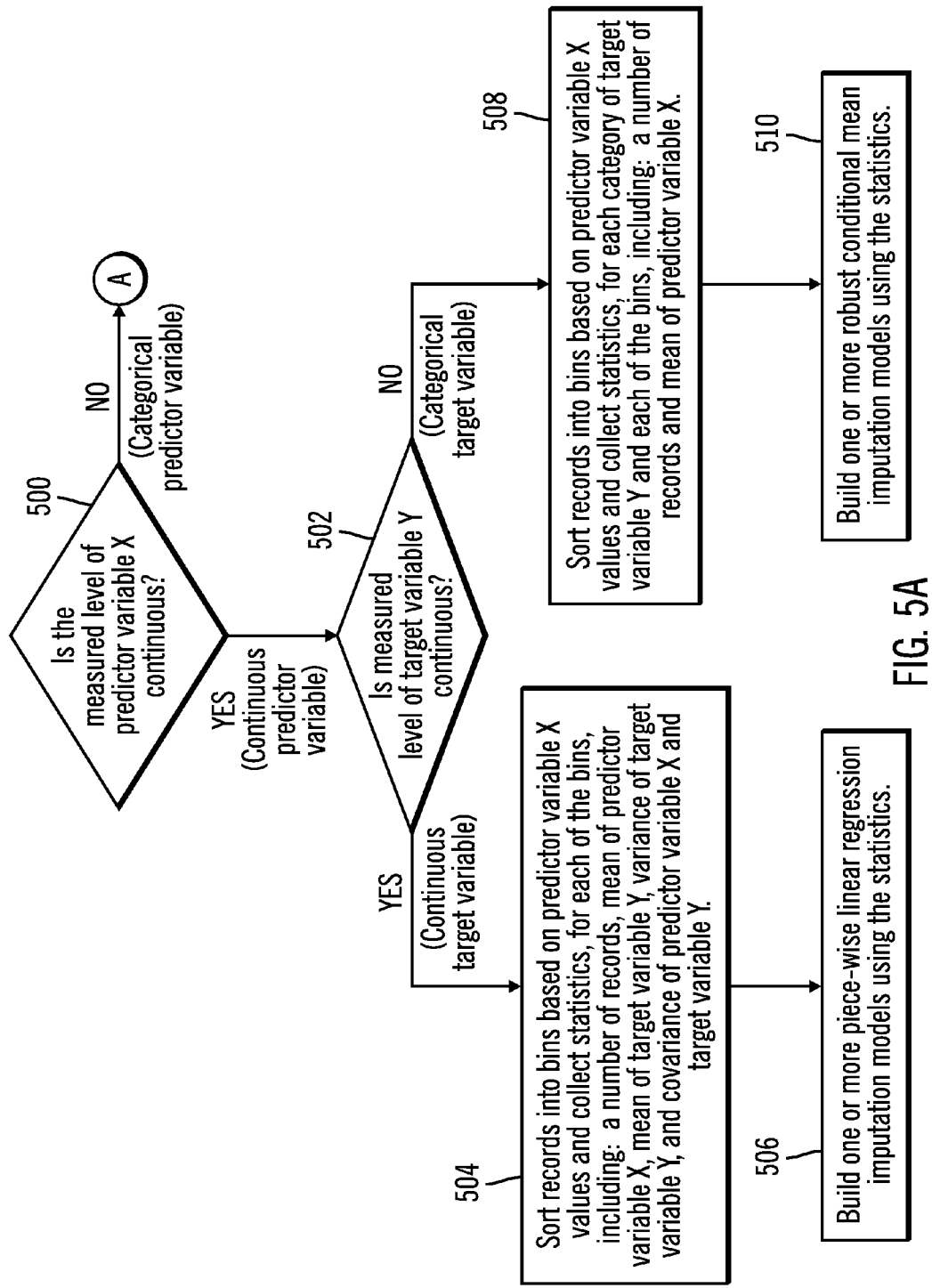
FIG. 5 illustrates, in a flow diagram, processing to build one or more imputation models in accordance with certain embodiments.
Figure 5B:
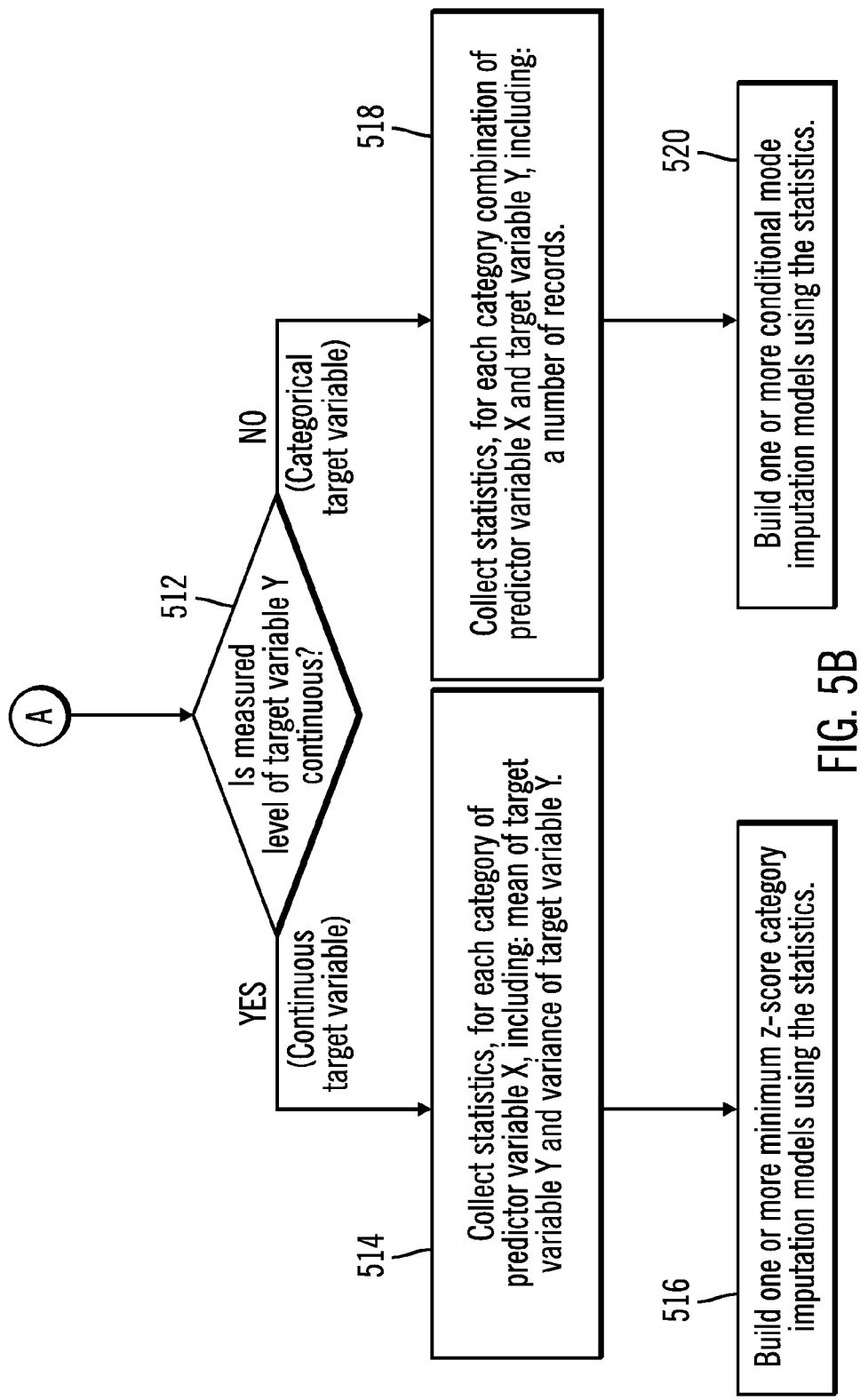

FIG. 5 illustrates, in a flow diagram, processing to build one or more imputation models in accordance with certain embodiments. FIG. 5 is formed by FIGS. 5A and 5B. According to the measurement levels of the predictor variable X and the target variable Y, four types of imputation models for the predictor variable X may be built.

Control begins at block 500 with the missing value imputation system 110 determining whether the measured level of the predictor variable X is continuous. If so, processing continues to block 502, otherwise, processing continues to block 512 (FIG. 5B).

In block 502, the missing value imputation system 110 determines whether the measured level of the target variable Y is continuous. If so, processing continues to block 504, otherwise, processing continues to block 508.

In block 504, the missing value imputation system 110 sorts records into data bins based on the predictor variable X values and collects statistics, for each of the data bins, including: (1) a number of records, (2) a mean of the predictor variable X, (3) a mean of the target variable Y, (4) a variance of the target variable Y, and (5) a covariance of the predictor variable X and the target variable Y. In particular, the missing value imputation system 110 assigns records into data bins, but does not store the records in the data bins. Instead, the missing value imputation system 110 saves statistics (based on the records) and discards the records. In block 506, the missing value imputation system 110 builds one or more piecewise linear regression imputation models using the statistics collected in block 504.

Figure 8:
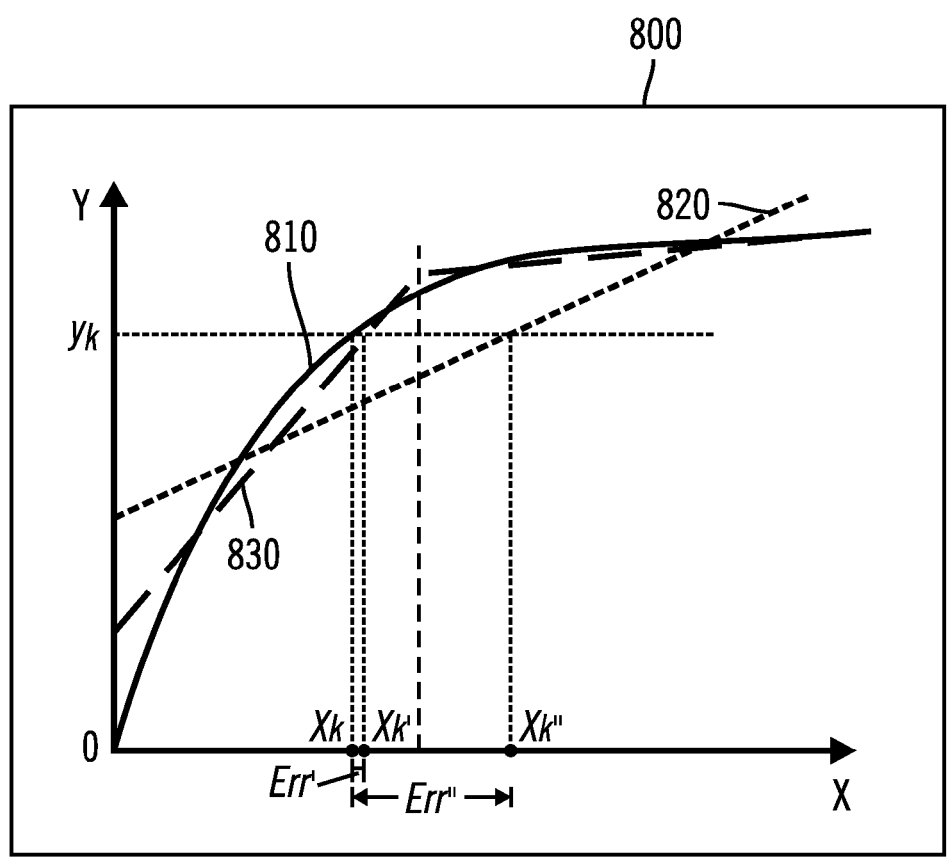
FIG. 8 illustrates, in a graph, comparison of missing value imputation between one linear regression and two piecewise linear regressions in accordance with certain embodiments.

If the predictor variable and target variable are both continuous, then the piecewise linear regression models of the predictor variable on the target variable are built as imputation models because they might capture a possible non-linear relationship between the predictor variable and the target variable. FIG. 8 illustrates, in a graph 800, comparison of missing value imputation between one linear regression and two piecewise linear regressions in accordance with certain embodiments. Using FIG. 8 as an example, suppose the true relation between predictor variable X and target variable Y is a parabola 810 (the solid line), but a linear regression 820 (the dotted line) is built to impute a missing value $x_k$, then the imputed value based on the target variable value of $y_k$ is $x_k''$. On the other hand, if two piecewise linear regressions 830 (the dashed line) are built, then the imputed value is $x_k'$, which is more accurate than $x_k''$.

To build piecewise linear regression models as imputation models, the predictor variable values, as well as, the corresponding target variable values are assigned into a list of data bins based on the locations of the predictor variable. The approach is to sort predictor variable where the data bins are usually used to compute order statistics.

Suppose that there are m bins $(a_1,a_2]$, $(a_2,a_3]$, . . . , $(a_m,a_{m+1}]$, where $a_1=-\infty$ and $a_{m+1}=\infty$ after collecting and merging data bins then the following basic statistics in the $i^{th}$ data bin are collected:

The number of records: $n^{(i)}$
Mean of Y: $\bar{Y}^{(i)}$,
Mean of X: $\bar{X}^{(i)}$,
Variance of Y: $S_{YY}^{(i)}$, and
Covariance of X and Y: $S_{XY}^{(i)}$.

Then the m piecewise linear regression models are built as follows:

$$X=\beta_0^{(i)}+\beta_1^{(i)}Y$$

where $\beta_1^{(i)}=S_{XY}^{(i)}/S_{YY}^{(i)}$ and $\beta_0^{(i)}X=\bar{X}^{(i)}-\beta_1^{(i)}\bar{Y}^{(i)}$, i=1, . . . m.

Figure 9:
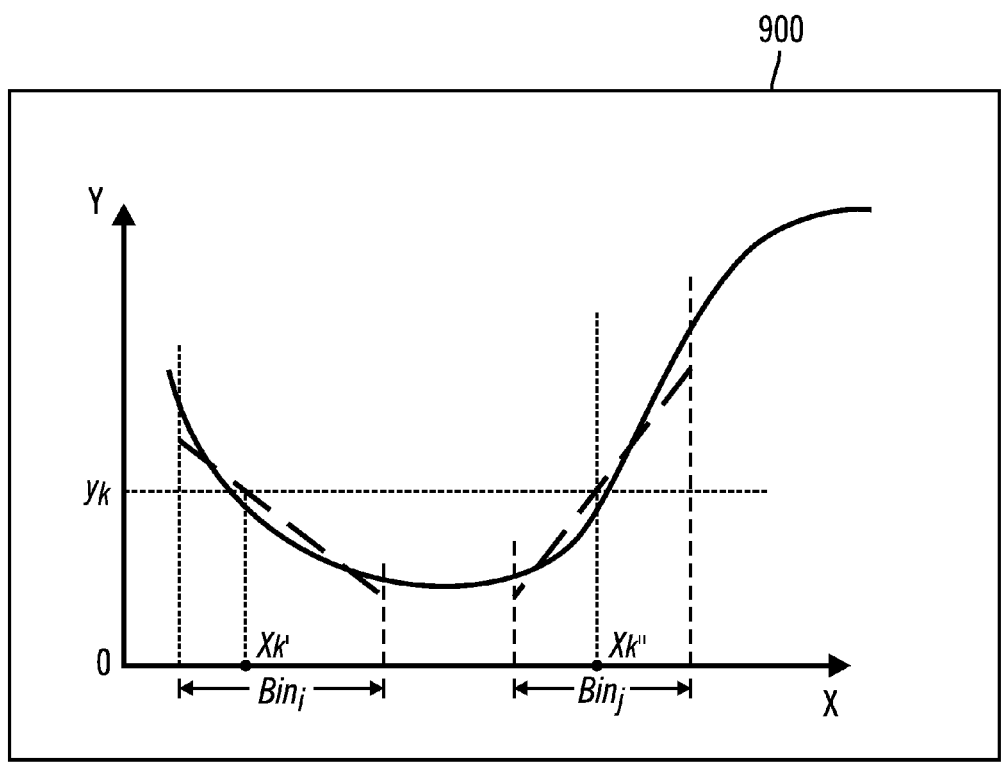
FIG. 9 illustrates, in a graph, an example of how two values may be used to replace a missing value in accordance with certain embodiments.

If the $k^{th}$ record is a missing value in prediction X with a known target variable category, $y_k$ then piecewise linear regression models are used to impute the missing value and an appropriate data bin has to be selected first. If there is only one data bin in which the condition $\beta_0^{(i)}+\beta_1^{(i)}y_k\in(a_i,a_{i+1}]$ holds, then the linear regression model in the $i^{th}$ data bin is used. However, there may exist more than one data bin that satisfies the above condition, say $\beta_0^{(i)}+\beta_1^{(i)}y_k\in(a_i,a_{i+1}]$ and $\beta_0^{(j)}+\beta_1^{(j)}y_k\in(a_j,a_{j+1}]$ FIG. 9 illustrates, in a graph 900, an example of how two values may be used to replace a missing value in accordance with certain embodiments. Using FIG. 9 as an example, a known target variable value $y_k$ is applied to m models, then two scores $x_k'$ in the $i^{th}$ data bin and $x_k''$ in the $j^{th}$ data bin may be used to impute the missing value of X. Under this circumstance, a random number from the Bernoulli distribution B(p), which is a special case of binomial distribution with 1 trial, where $p=n^{(i)}/(n^{(i)}+n^{(j)})$, is generated to determine which score should be used. If the random number is 1, then the missing value is imputed by $x_k'$ in the $i^{th}$ data bin, otherwise, $x_k''$ in the $j^{th}$ data bin is used. This technique may be generalized to the situation of more than two data bins by using a categorical distribution, which is a special case of multinomial distribution with 1 trial.

In block 508, the missing value imputation system 110 sorts records into data bins based on the predictor variable X values and collects statistics, for each category of the target variable Y and each of the data bins, including: (1) a number of records and (2) a mean of the predictor variable X. As mentioned above, the missing value imputation system 110 assigns records into data bins, but does not store the records in the data bins. Instead, the missing value imputation system 110 saves statistics (based on the records) and discards the records. In block 510, the missing value imputation system 110 builds one or more robust conditional mean imputation models using the statistics collected in block 508.

If the predictor variable is continuous, but the target variable is categorical, then the predictor variable values, as well as, the corresponding target variable categories are assigned into a list of data bins based on the locations of the predictor variable.

Suppose that there are m bins $(a_1,a_2]$, $(a_2,a_3]$, . . . , $(a_m,a_{m+1}]$, where $a_1=-\infty$ and $a_{m+1}=\infty$ after collecting and merging data bins, then the following basic statistics of X for the $j^{th}$ category of Y, j=1, . . . , J, in the $i^{th}$ data bin are collected:

The number of records: $n^{(i,j)}$, and
Mean of X: $\bar{X}^{(i,j)}$.

FIG. 10 illustrates, in a table 1000, basic statistics in each combination of the predictor variable data bin and target variable category in accordance with certain embodiments.

The first and the last S data bins are discarded in the following mean computation, where S is a specified constant that does not vary with the size of the data. Then, for each target variable category, the rest of the data bins are merged and the corresponding mean of the predictor variable is obtained as follows:

$$\overline{X}_{Y=j} = \frac{1}{\sum_{i=S+1}^{m-S} n^{(i,j)}} \sum_{i=S+1}^{m-S} n^{(i,j)} \overline{X}^{(i,j)}.$$

The conditional mean computed in this way is more robust because the S smallest values and S largest values as potential outliers are excluded. This is referred to herein as robust conditional mean imputation model.

If the $k^{th}$ record is a missing value in predictor variable X with a known target variable category, $y_k$, then the missing value is imputed by the robust conditional mean of X conditional on $Y=y_k$.

In block 512, the missing value imputation system 110 determines whether the measured level of the target variable Y is continuous. If so, processing continues to block 514, otherwise, processing continues to block 518.

In block 514, the missing value imputation system 110 collects statistics, for each category of the predictor variable X, including: (1) a mean of the target variable Y and (2) a variance of the target variable Y. In block 516, the missing value imputation system 110 builds one or more minimum z-score category imputation models using the statistics collected in block 514.

For a categorical predictor variable with a continuous target variable, the mean and variance of a target variable in each category of the predictor variable are collected to represent the target variable's distribution in the corresponding category. Suppose a categorical predictor variable X has 1, . . . , J categories, then the following basic statistics of Y for the $j^{th}$ category of X are collected:

Mean of Y: $\overline{Y}^{(j)}$

Variance of Y: $s_{YY}^{(j)}$

If the $k^{th}$ record is a missing value in predictor variable X with a known target variable value, $y_k$, then, the missing value will be imputed with a predictor variable category by judging which distribution the target variable value $y_k$ is more likely to belong to, that is the missing value will be imputed as follows:

$$x_k = \arg\min_j \left\{ \left| \frac{y_k - \overline{Y}^{(j)}}{\sqrt{s_{YY}^{(j)}}} \right|, j = 1, \ldots, J \right\}.$$

This is referred to herein as a minimum z-score category imputation model.

In block 518, the missing value imputation system 110 collects statistics, for each category combination of the predictor variable X and the target variable Y, including: a number of records. In block 520, the missing value imputation system 110 builds one or more conditional mode imputation models using the statistics collected in block 518.

If both the predictor variable and the target variable are categorical, then a contingency table is generated. That is, the number of records in each category combination of the predictor variable and target variable is collected to form the contingency table. If the $k^{th}$ record is a missing value in predictor variable X with a known target variable category, $y_k$, then the missing value is imputed by the mode of X conditional on $Y=y_k$. This is referred to herein as a conditional mode imputation model.

FIG. 6 illustrates, in a table 600, determination of a type of imputation model to construct based on data source type (small or large and distributed) and whether predictor variable and target variables are categorical or continuous in accordance with certain embodiments. In certain embodiments, one data source is treated as a data source type of "small", while multiple data sources are treated as a data source type of "large and distributed".

FIG. 7 illustrates, in a table 700, constructing an imputation model of the determined imputation model type using basic statistics between a predictor variable and a target variable determined using a single pass over the data in accordance with certain embodiments.

The missing value imputation system 110 builds imputation models based only on the target variable information and based on determining which imputation model type to construct (which is based on the data source type and the measurement levels of the predictor variable and target variable (i.e., categorical or continuous)).

The missing value imputation system 110 reduces the required resources (e.g., time) for imputing missing values and, thus, allows for missing value imputation to be used more frequently, especially for large or complex data sets.

The missing value imputation system 110 uses a single data pass no matter the data source is small or large and distributed.

The missing value imputation system 110 uses one or more imputation models to generate one set of values for inputs with missing values.

The missing value imputation system 110 handles missing value imputations first in order to build a reliable predictive model.

Thus, the missing value imputation system 110 builds one or more imputation models to impute missing predictor variable values based only on the target variable information by determining the type of imputation model to construct based on the data source type and whether the predictor variable and target variables are categorical or continuous.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
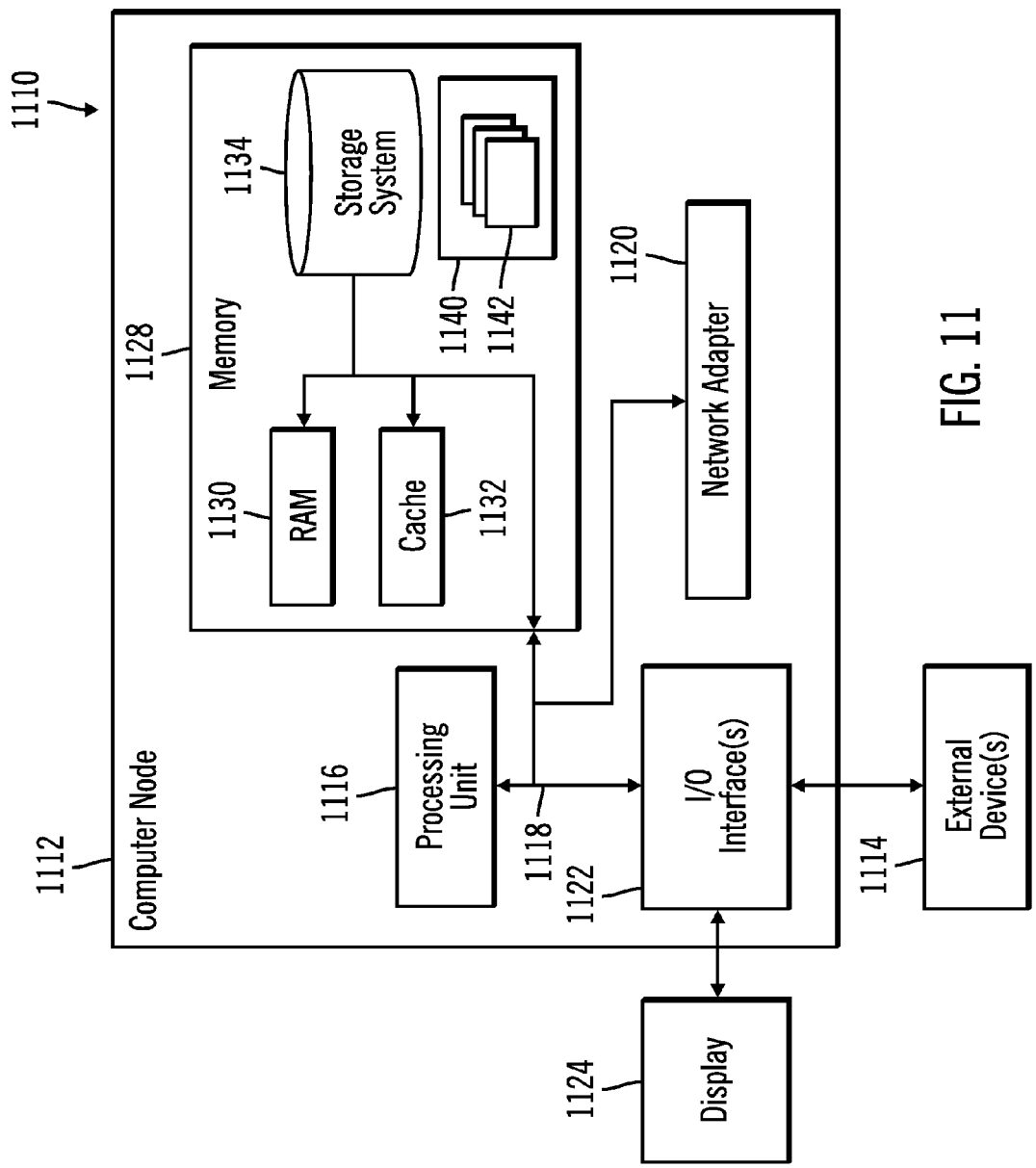
FIG. 11 depicts a cloud computing node in accordance with certain embodiments.

Referring now to FIG. 11, a schematic of an example of a cloud computing node is shown. Cloud computing node 1110 is only one example of a suitable cloud computing node and is not intended to suggest any limitation as to the scope of use or functionality of embodiments of the invention described herein. Regardless, cloud computing node 1110 is capable of being implemented and/or performing any of the functionality set forth hereinabove.

In cloud computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in cloud computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

Figure 12:
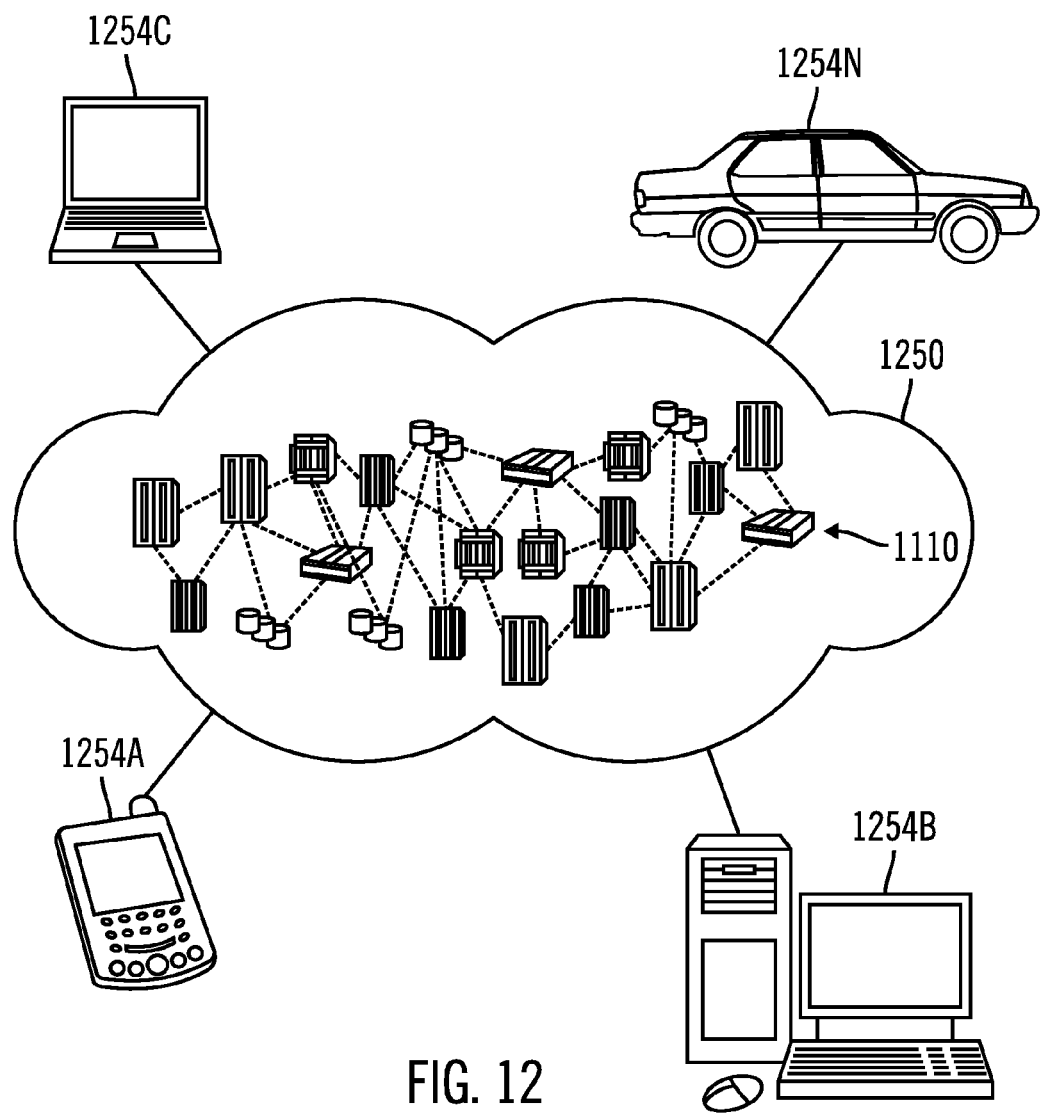
FIG. 12 depicts a cloud computing environment in accordance with certain embodiments.

Referring now to FIG. 12, illustrative cloud computing environment 1250 is depicted. As shown, cloud computing environment 1250 comprises one or more cloud computing nodes 1110 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1110 and cloud computing environment 1250 can communicate with any type of computerized device over any type of network and/or network addressable connection (e.g., using a web browser).

Figure 13:
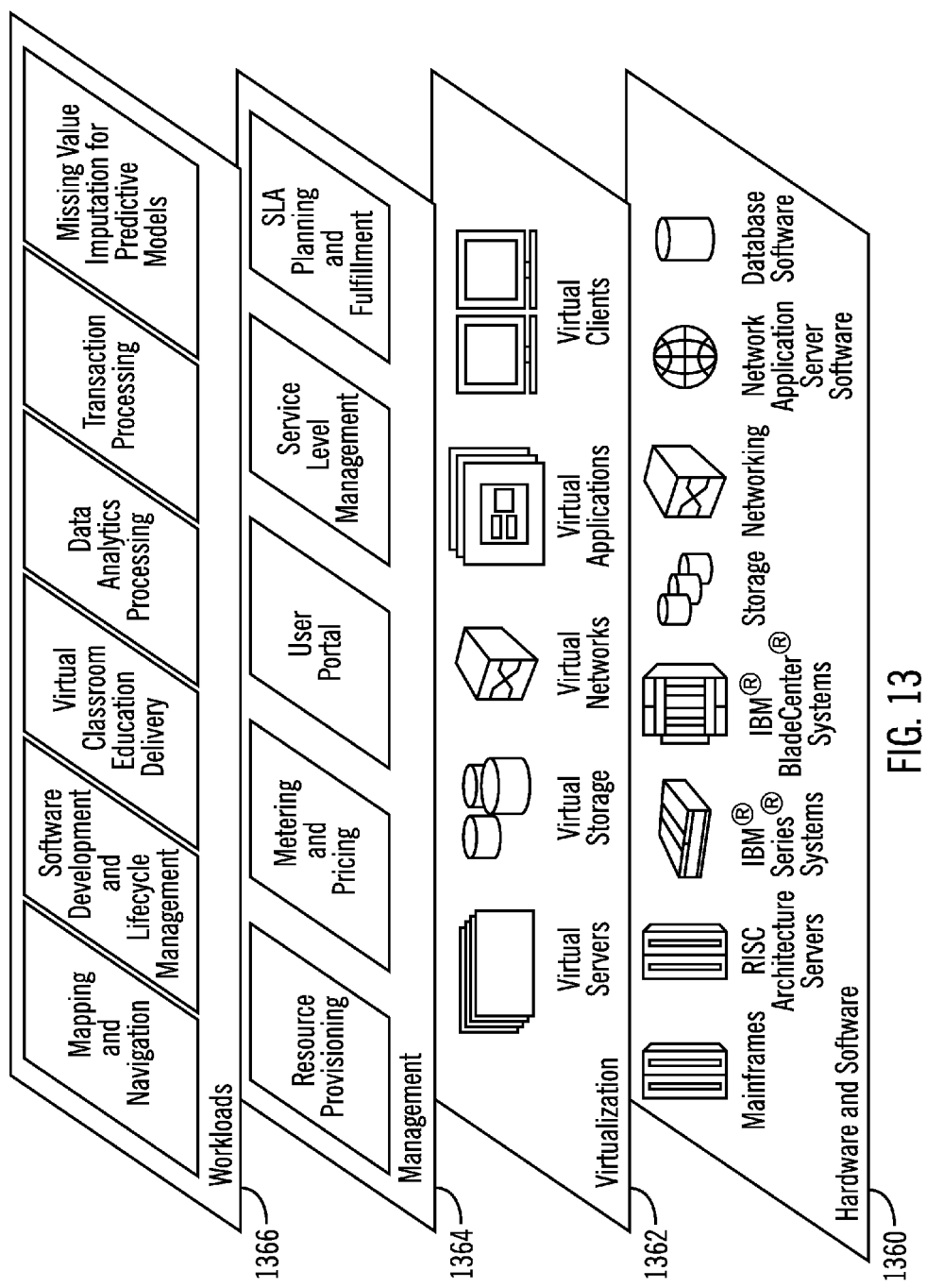
FIG. 13 depicts abstraction model layers in accordance with certain embodiments.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 1362 provides an abstraction layer from which the following examples of virtual entities may be provided: virtual servers; virtual storage; virtual networks, including virtual private networks; virtual applications and operating systems; and virtual clients.

In one example, management layer 1364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and missing value imputation for predictive models.

Thus, in certain embodiments, software, implementing missing value imputation for predictive models in accordance with embodiments described herein, is provided as a service in a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for imputing a missing value for each of one or more predictor variables, comprising:
   with each mapper from a set of mappers that receives data from a different data source, building an imputation model based on information of a target variable and that data source;
   with a reducer, randomly extracting validation samples from each different data source to create a global validation sample;
   with each mapper, scoring the imputation model built at that mapper based on the global validation sample and the imputation model built at each other mapper;
   with the reducer, selecting a top number of imputation models based on the scoring of each imputation model to form an ensemble model; and
   with each mapper,
     determining a type of imputation model to construct;
     imputing the missing value for each of the one or more predictor variables using the data from each different data source, each ensemble model, and the determined type of imputation model to generate a completed data set; and
   performing prediction, discovery, and interpretation of relationships between the target variable and the one or more predictor variables using the completed data set.

2. The method of claim 1, wherein a measurement level comprises one of continuous and categorical.

3. The method of claim 1, further comprising:
   determining that a predictor variable is continuous and the target variable is continuous;
   sorting records into data bins based on the predictor variable values;
   collecting, for each of the data bins, statistics comprising a number of records, a mean of the predictor variable, a mean of the target variable, a variance of the target variable, and a covariance of the predictor variable and the target variable;
   determining that the type of the imputation model is a piecewise linear regression imputation model;

and building the piecewise linear regression imputation model using the collected statistics.

4. The method of claim 1, further comprising:
determining that a predictor variable is continuous and the target variable is categorical;
sorting records into data bins based on the predictor variable values;
collecting, for each category of the target variable and each of the data bins, statistics comprising a number of records and a mean of the predictor variable;
determining that the type of the imputation model is a robust conditional mean imputation model; and
building the robust conditional mean imputation model using the collected statistics.

5. The method of claim 1, further comprising:
determining that a predictor variable is categorical and the target variable is continuous;
collecting, for each category of the predictor variable, statistics comprising a mean of the target variable and a variance of the target variable;
determining that the type of the imputation model is a minimum z-score category imputation model; and
building the minimum z-score category imputation model using the collected statistics.

6. The method of claim 1, further comprising:
determining that a predictor variable is categorical and the target variable is categorical;
collecting, for each category combination of the predictor variable and the target variable, statistics comprising a number of records;
determining that the type of the imputation model is a conditional mode imputation model; and
building the conditional mode imputation model using the collected statistics.

7. The method of claim 1, wherein software is provided as a service in a cloud environment.

8. A computer program product for imputing a missing value for each of one or more predictor variables, the computer program product comprising a non-transitory computer readable storage medium having computer readable program code embodied therein, the computer readable program code, when executed by a processor of a computer, configured to perform:
with each mapper from a set of mappers that receives data from a different data source, building an imputation model based on information of a target variable and that data source;
with a reducer, randomly extracting validation samples from each different data source to create a global validation sample;
with each mapper, scoring the imputation model built at that mapper based on the global validation sample and the imputation model built at each other mapper;
with the reducer, selecting a top number of imputation models based on the scoring of each imputation model to form an ensemble model; and
with each mapper,
determining a type of imputation model to construct;
imputing the missing value for each of the one or more predictor variables using the data from each different data source, each ensemble model, and the determined type of imputation model to generate a completed data set; and
performing prediction, discovery, and interpretation of relationships between the target variable and the one or more predictor variables using the completed data set.

9. The computer program product of claim 8, wherein the computer readable program code, when executed by the processor of the computer, is configured to perform:
determining that a predictor variable is continuous and the target variable is continuous;
sorting records into data bins based on the predictor variable values;
collecting, for each of the data bins, statistics comprising a number of records, a mean of the predictor variable, a mean of the target variable, a variance of the target variable, and a covariance of the predictor variable and the target variable;
determining that the type of the imputation model is a piecewise linear regression imputation model;
and building the piecewise linear regression imputation model using the collected statistics.

10. The computer program product of claim 8, wherein the computer readable program code, when executed by the processor of the computer, is configured to perform:
determining that a predictor variable is continuous and the target variable is categorical;
sorting records into data bins based on the predictor variable values;
collecting, for each category of the target variable and each of the data bins, statistics comprising a number of records and a mean of the predictor variable;
determining that the type of the imputation model is a robust conditional mean imputation model; and
building the robust conditional mean imputation model using the collected statistics.

11. The computer program product of claim 8, wherein the computer readable program code, when executed by the processor of the computer, is configured to perform:
determining that a predictor variable is categorical and the target variable is continuous;
collecting, for each category of the predictor variable, statistics comprising a mean of the target variable and a variance of the target variable;
determining that the type of the imputation model is a minimum z-score category imputation model; and
building the minimum z-score category imputation model using the collected statistics.

12. The computer program product of claim 8, wherein the computer readable program code, when executed by the processor of the computer, is configured to perform:
determining that a predictor variable is categorical and the target variable is categorical;
collecting, for each category combination of the predictor variable and the target variable, statistics comprising a number of records;
determining that the type of the imputation model is a conditional mode imputation model; and
building the conditional mode imputation model using the collected statistics.

13. The computer program product of claim 8, wherein software is provided as a service in a cloud environment.

14. A computer system for imputing a missing value for each of one or more predictor variables, comprising:
a processor; and
a storage device coupled to the processor, wherein the storage device has stored thereon a program, and wherein the processor is configured to execute the program to perform operations, wherein the operations comprise:

with each mapper from a set of mappers that receives data from a different data source, building an imputation model based on information of a target variable and that data source;

with a reducer, randomly extracting validation samples from each different data source to create a global validation sample;

with each mapper, scoring the imputation model built at that mapper based on the global validation sample and the imputation model built at each other mapper;

with the reducer, selecting a top number of imputation models based on the scoring of each imputation model to form an ensemble model; and with each mapper,
determining a type of imputation model to construct;
imputing the missing value for each of the one or more predictor variables using the data from each different data source, each ensemble model, and the determined type of imputation model to generate a completed data set; and performing prediction, discovery, and interpretation of relationships between the target variable and the one or more predictor variables using the completed data set.

15. The computer system of claim 14, wherein the operations further comprise:
determining that a predictor variable is continuous and the target variable is continuous;
sorting records into data bins based on the predictor variable values;
collecting, for each of the data bins, statistics comprising a number of records, a mean of the predictor variable, a mean of the target variable, a variance of the target variable, and a covariance of the predictor variable and the target variable;
determining that the type of the imputation model is a piecewise linear regression imputation model;
and building the piecewise linear regression imputation model using the collected statistics.

16. The computer system of claim 14, wherein the operations further comprise:
determining that a predictor variable is continuous and the target variable is categorical;
sorting records into data bins based on the predictor variable values;
collecting, for each category of the target variable and each of the data bins, statistics comprising a number of records and a mean of the predictor variable;
determining that the type of the imputation model is a robust conditional mean imputation model; and
building the robust conditional mean imputation model using the collected statistics.

17. The computer system of claim 14, wherein the operations further comprise:
determining that a predictor variable is categorical and the target variable is continuous;
collecting, for each category of the predictor variable, statistics comprising a mean of the target variable and a variance of the target variable;
determining that the type of the imputation model is a minimum z-score category imputation model; and
building the minimum z-score category imputation model using the collected statistics.

18. The computer system of claim 14, wherein the operations further comprise:
determining that a predictor variable is categorical and the target variable is categorical;
collecting, for each category combination of the predictor variable and the target variable, statistics comprising a number of records;
determining that the type of the imputation model is a conditional mode imputation model; and
building the conditional mode imputation model using the collected statistics.

19. The computer system of claim 14, wherein software is provided as a service in a cloud environment.

* * * * *